United States Patent [19]

Jones et al.

[11] 4,373,958

[45] Feb. 15, 1983

[54] ROAD BASE STABILIZATION USING LIME KILN DUST

[75] Inventors: Dennis A. Jones, Marietta; Bruce E. Boggs, Roswell, both of Ga.

[73] Assignee: JTM Industries, Inc., Marietta, Ga.

[21] Appl. No.: 337,221

[22] Filed: Jan. 6, 1982

[51] Int. Cl.³ .............................................. C04B 1/00
[52] U.S. Cl. .................................................. 106/118
[58] Field of Search ................... 106/118, 120, DIG. 1

[56] References Cited

U.S. PATENT DOCUMENTS 3,076,717  2/1963  Minnick .
4,018,617  4/1977  Nicholson .
4,038,095  7/1977  Nicholson ......................... 106/118
4,040,852  8/1977  Jones .
4,101,332  7/1978  Nicholson .

*Primary Examiner*—James Poer
*Attorney, Agent, or Firm*—Biebel, French & Nauman

[57] ABSTRACT

A two-part road base stabilization mix consists of lime kiln dust made from non-dolomitic or high calcium limestone having 10% or less magnesium oxide in the final product, is combined with an aggregate employing from 3 to 30% by weight of lime kiln dust, and the remaining weight consisting of aggregate.

6 Claims, No Drawings

ROAD BASE STABILIZATION USING LIME KILN DUST

This invention relates to road base stabilization and more particularly to bases for highways, airport runways or the like, which bases will subsequently be covered with a wearing surface such as asphalt concrete or other suitable wearing surface.

The invention includes the use of a waste product known as lime kiln dust or bag-house lime. Lime kiln dust is a by-product dust resulting from the product of pebble lime (calcium oxide) in a rotary kiln. High purity limestone, primarily calcium carbonate ($CaCO_3$) is first crushed to pebble size and is then calcined in a rotary kiln by the burning of coal, to produce pebble lime. As the pebbles of limestone move through the kilning process, the dust resulting from the calcination and the inter-grinding of the pebbles is captured in a bag-house dust collector from which it receives its name lime kiln dust or bag-house lime.

Two distinctively different types of lime kiln dust are available in the United States. These difference types result primarily in the differences in the raw materials which are used in the making of lime. One such distinctive type is a by-product of calcining dolomitic limestone, $CaMg(CO_3)_2$. The lime kiln dust resulting from the manufacturer of lime with dolomitic limestone contains a substantial amount of magnesium oxide (MgO), often in the range of from 20 to 45% by volume. The second kind of lime kiln dust, and is the one used as a principal component of road base or pavement bases or stabilizers in the present invention is quite different from the first kind of lime kiln dust above in that it is the by-product of calcining relatively high purity or high calcium limestone ($CaCO_3$) as the term is defined in ANSI/ASTM C-51-71. This product contains less than 10% magnesium oxide (preferably having 5% or less magnesium oxide) and contains in excess of 30% CaO.

Most highway bases are constructed using an aggregate base material such as crushed limestone, granite, slag, gravel or other types of aggregates. Over twenty years ago, Dr. Minnick filed an application for a three component system using hydrated lime, coal fly ash (from furnaces burning pulverized coal), and an aggregate to form a stabilized aggregate base, which product was sold and licensed under the trade name "Poz-O-Pac", and received U.S. Pat. No. 3,076,717 of Feb. 5, 1963.

More recently, Nicholson has promoted three-component road base stabilization systems which do not use hydrated lime. Rather, they use fly ash, an aggregate, and either cement kiln dust, or lime kiln dust of the dolomitic variety, and is marketed under the trademark N-VIRO-CRETE, and is described in the patents of Nicholson, U.S. Pat. Nos. 4,038,095 issued July 26, 1977, 4,018,617 issued Apr. 19, 1977 and 4,101,332 issued July 18, 1978.

SUMMARY OF THE INVENTION

The present invention is directed to two-art base stabilization employing essentially lime kiln dust resulting from the production of lime from relatively high purity limestone in which the lime kiln dust has preferably 10% or less magnesium oxide, as a cementing agent in combination with sound and durable aggregate material, without requiring the use of fly ash as a pozzolan or as a cementing material. Thus, the lime kiln dust used in the present invention is the by-product which results from the production of pebble lime in a rotary kiln where primarily calcium carbonate rather than dolomitic stone is used as the raw material.

Preferably, the aggregate component employed in the stabilized road base composition of the present invention consists of pond ash, also known as bottom ash. Bottom ash or pond ash is the by-product of burning pulverized coal in a dry bottom coal-burning furnace. When pulverized coal is burned in a dry bottom furnace, a portion of the ash content collects or falls or runs into the furnace bottom, and is collected and removed from the region of the furnace, usually by a water sluice and carried into a collection pond. For this reason, this material is often referred to as pond ash. The major portion of the dry-bottom ash consists of the heavier and agglomerated particles which have fused together in the combustion process and have formed discrete lumps or massive which are too heavy to be entrained or captured in the flow of combustion gases through the furnace and thus fall to the bottom and become part of the pond ash. The pond ash may also contain a certain amount of iron pyrite or other impurities which has been discharged from the coal pulverizing unit and conveniently dumped into the pond. A further description of pond ash and how it is formed is contained in the Patent of Jones, U.S. Pat. No. 4,040,852 of Aug. 9, 1977.

When pond ash aggregate and lime kiln dust are combined as an essentially two-ingredient road base stabilization mix, using anywhere from 3 to 15% lime kiln dust by weight, a mixture is provided which has compressive strengths which fully meet the load requirements for base stabilization, without the necessity of adding any fly ash to the mixture.

In another aspect of the invention, ordinary crushed limestone bases, also known as crusher run bases, can be increased substantially in load-bearing strength by the pre-mixing with the crusher run of from about 3 to 30% of the lime kiln dust, as identified above, with a suitable amount of moisture prior to laying the base. The use of the two-part base material of the present invention, in which one of the parts comprise a crusher run of limestone, permits the achievement of the desired California bearing ratio (CBR) by use of less material than required for crusher run material alone, or alternatively, permits the use of the same thickness of material with a substantially higher load bearing capacity.

In a further aspect of the invention ordinary sound, durable natural aggregates such as granite or gravel may be used as the aggregate portion of the invention combination with improvement in the load bearing ratio.

It is accordingly an important object of the present invention to provide a base stabilization mixture consisting essentially of lime kiln dust and a sound durable aggregate material.

It is more particularly an object of this invention to provide a two-part road base stabilization mixture consisting of non-dolomitic lime kiln dust, as defined above, and pond ash as an aggregate.

These and other objects and advantages of the invention will be apparent from the following description and the appended claims.

DESCRIPTION OF PREFERRED EMBODIMENT

The lime kiln dust used in the present invention is the by-product resulting from the production of pebble lime, calcium oxide, in a rotary kiln, where essentially high purity limestone or calcium carbonate is used as the raw material rather than dolomitic limestone, resulting in lime kiln dust compositions which have less than 10% magnesium oxide, and preferably less than 5% MgO. The following table provides four typical analyses of lime kiln dust as used in the present invention, which, to distinguish from dolomitic lime kiln dust, may be referred to as a "high calcium" lime kiln dust.

|  | Source A | Source B | Source C | Source D |
|---|---|---|---|---|
| $SiO_2$ | 17.11% | 7.68% | 3.99% | 16.91% |
| $Al_2O_3$ | 8.79% | 4.01% | 1.56% | 8.04% |
| $Fe_2O_3$ | 2.09% | 1.43% | 1.42% | 2.52% |
| CaO | 39.36% | 57.37% | 67.34% | 48.97% |
| MgO | 4.00% | 0.95% | 4.87% | 2.78% |
| $TiO_2$ | 0.56% | 0.33% | 0.28% | 0.50% |
| $SO_3$ | 4.81% | 3.72% | 5.37% | 5.63% |
| $Na_2O$ | 0.40% | 0.28% | 0.08% | 0.40% |
| $K_2O$ | 2.22% | 0.75% | 0.51% | 1.93% |
| LOI | 18.57% | 22.48% | 13.85% | 11.58% |
| % Retained 200 | 17.91 | 14.94 | 31.99 | 11.58 |
| Specific Gravity | 2.60 | 2.78 | 2.91 | 2.70 |

The preferred pond ash or bottom ash component of this invention has about 10-30% fines defined as about 10-30% passing a 200-mesh screen, although a coarser aggregate may be used with somewhat lower compressive strengths. While it is preferred to use pond ash with 10% fines or more, as defined above, substantially coarser pond ash may be used with good results.

It has been found desirable to provide a base stabilization mixture which increases in ultimate strength rather slowly, or in other words over a rather substantial period of time as distinguished from base stabilization mixes which obtain maximum strength in only a few days. It has been found that the slower reaction prevents thermal shock from fracturing the base and sometimes fracturing the overlying pavement itself, which sometimes occurs with fast setting base stabilization materials. The somewhat coarser aggregate mixes started out with very low compressive strengths after only one or two weeks, but by twenty or thirty weeks time, have acquired substantial strengths in excess of 500 psi.

Tests have been run using pond ash as an aggregate in road base stabilizations with the following approximate analysis.

| Size | 1½" | ¾" | ⅜" | 10 | 100 | 200 |
|---|---|---|---|---|---|---|
| % Passing | 100 | 91 | 74 | 42 | 18 | 12 |
| Typical Range | 90-100 | 75-100 | 40-90 | 25-65 | 5-40 | 3-30 |

Stabilized base mixtures using the above-identified pond ash as an aggregate, and consisting essentially of two ingredients have been made as follows:

|  | Approximate % by Dry Weight |
|---|---|
| Lime Kiln Dust | 3 to 15% |
| Pond Ash Aggregate | 85 to 97% |

Moisture-Density Relationship Tests (Standard Proctors) were made in accordance ASTM D-598 method C using a four inch mold. A five and one-half pound hammer with twelve inch drop was used to compact the lime kiln dust/pond ash aggregate mixture. A standard Proctor test is made to determine the optimum moisture and optimum density of the lime kiln dust/pond ash aggregate mixture. Once the optimum moisture and optimum density is determined, samples are molded according to ASTM D-598 procedures. After molding, the samples are removed from the four inch mold, weighed, then sealed in plastic bags to maintain the optimum moisture during the curing process. The molded samples are cured at a constant temperature of 100° F. until tested. Compressive strength test are generally conducted at 7, 14 and 28 days after molding. After removal from the curing oven, the samples are submerged in water for four hours then removed and allowed to drain on a non-absorbant surface. The samples are capped with a capping compound such as "Hydrocal" or sulfur capping compound, both quick hardening materials. The capping is necessary to provide an even parallel cap on the test specimens.

Examples of tests and computations are as follows, using pond ash aggregate in accordance with the above defined size distribution and using approximately 10% moisture. All percentages shown are by weight.

| Mix Designs | | | |
|---|---|---|---|
| High Calcium Lime Kiln Dust | 4% | 6% | 8% |
| Pond Ash Aggregate | 96% | 94% | 92% |
| % Lime | PSI | (DAYS) | |
| 4% | 139 | 7 | |
| 4% | 480 | 28 | |
| 4% | 390 | 56 | |
| 6% | 130 | 7 | |
| 6% | 788 | 28 | |
| 6% | 758 | 56 | |
| 8% | 346 | 7 | |
| 8% | 716 | 28 | |
| 8% | 959 | 56 | |

It will thus be seen from the above table that quite satisfactory compressive strengths are achieved by the use of the base stabilization composition of the present invention, in a simpler two-part system which uses two components which are normally considered as waste products, namely, bag-house lime and pond ash.

As previously mentioned, substantial advantages of a two-part stabilized base in accordance with this invention may be achieved by using a high calcium lime kiln dust, substantially as identified above, in combination with a crusher run of crushed limestone with a size distribution of from 1-½" to dust, with the following being a typical example:

95% passing a ⅜" mesh,
75% passing a No. 4 screen,
40% passing a No. 10 screen,
23% passing a No. 20 screen,
18% passing a No. 40 screen, and
about 6% passing a No. 200 screen.

Such a crusher run consists of dry crushed limestone, and the second dry ingredient consists of from about 3% to about 30% of high calcium non-dolomitic lime kiln dust. Using less than 3% lime kiln dust does not provide a sufficient increase in load-bearing strength to justify the mixing of the base material with a suitable quantity of moisture or water prior to application, whereas use of substantially more than 30% lime kiln dust does not result in corresponding increases in strength. Each of the following mixes were made with lime kiln dust and crusher run, as identified above, mixed with water at the rate of 1 part of water to 1.6 parts of lime kiln dust. The percentages of lime kiln dust, dry by weight are given, the remainder comprising crusher run.

|  |  | PSI |
|---|---|---|
| Mix 1–5% | A. 3 day | 87.5 |
|  | B. 7 day | 118.75 |
|  | C. 28 day | 237.5 |
| Mix 2–10% | A. 3 day | 112.5 |
|  | B. 7 day | 187.5 |
|  | C. 28 day | 350.0 |
| Mix 3–15% | A. 3 day | 200.0 |
|  | B. 7 Day | 325.0 |
|  | C. 28 day | 550.0 |
| Mix 4–20% | A. 3 day | 131.25 |
|  | B. 7 day | 187.5 |
|  | C. 28 day | 356.25 |
| Mix 5–35% | A. 3 day | 125.0 |
|  | *B. 7 day | 100.0 |
|  | *C. 28 day | 406.25 |
| Mix 6–40% | **A. 3 day | 106.25 |
|  | *B. 7 day | 112.5 |
|  | *C. 28 day | 425.0 |

*Small cracks
**Small cracks before testing

It will accordingly be seen that the 28 day strengths provide a very substantial improvement, in each instance, over the 3 day strengths, resulting a stabilized base, which has a substantially improved load bearing ability over that of conventional crusher run limestone.

Also, as previously noted, the aggregate components may include or comprise ordinary sound, durable natural aggregates such as granite or gravel.

While the products herein described constitute preferred embodiments of this invention, it is to be understood that the invention is not limited to these precise product, and that changes may be made therein without departing from the scope of the invention.

What is claimed is:

1. An essentially two-part road base stabilization mix comprising lime kiln dust as a by-product of manufacturing pebble lime from relatively high purity limestone having, in the lime kiln dust, no more than 10% magnesium oxide and having in excess of 30% calcium oxide and an aggregate, in which the lime kiln dust comprises about 3% to about 30% by weight of the total mix.

2. A road base stabilization mix comprising essentially two parts consisting of lime kiln dust as a by-product of calcining relatively high purity limestone having less than 10% magnesium oxide in the lime kiln dust, and bottom ash formed as a by-product of burning pulverized coal in a dry-bottom furnace as an aggregate, and having from 3 to 15% by weight of said lime kiln dust and 85 to 97% by weight of said bottom ash.

3. The mix of claim 2 in which said lime kiln dust contains 30% or more CaO.

4. The mix of claim 1 in which said aggregate consists of a crusher run of limestone.

5. The mix of claim 1 in which said aggregate comprises at least 85% by weight of the mix and consists of pond ash.

6. The mix of claim 1 in which said aggregate comprises a sound durable natural aggregate such as granite or gravel.

* * * * *